United States Patent
Wyatt et al.

(10) Patent No.: US 8,346,811 B2
(45) Date of Patent: Jan. 1, 2013

(54) SYSTEM AND METHOD FOR ANALYZING AND REPORTING EXTENSIBLE DATA FROM MULTIPLE SOURCES IN MULTIPLE FORMATS

(75) Inventors: Nat Wyatt, San Francisco, CA (US); Joseph E. Rozenfeld, San Carlos, CA (US)

(73) Assignee: Skytide, Inc., Oakland, CA (US)

( * ) Notice: Subject to any disclaimer, the term of this patent is extended or adjusted under 35 U.S.C. 154(b) by 51 days.

(21) Appl. No.: 12/630,704

(22) Filed: Dec. 3, 2009

(65) Prior Publication Data

US 2010/0076977 A1 Mar. 25, 2010

Related U.S. Application Data

(63) Continuation of application No. 11/370,522, filed on Mar. 7, 2006, now Pat. No. 7,630,956.

(60) Provisional application No. 60/659,543, filed on Mar. 7, 2005.

(51) Int. Cl.
*G06F 17/00* (2006.01)
(52) U.S. Cl. ........................ 707/793
(58) Field of Classification Search .................. 707/793
See application file for complete search history.

(56) References Cited

U.S. PATENT DOCUMENTS

| | | | |
|---|---|---|---|
| 5,675,785 A * | 10/1997 | Hall et al. | 707/600 |
| 6,601,062 B1 * | 7/2003 | Deshpande et al. | 1/1 |
| 7,051,038 B1 | 5/2006 | Yeh et al. | |
| 7,139,779 B1 | 11/2006 | Kornelson et al. | |
| 2004/0034666 A1 * | 2/2004 | Chen | 707/104.1 |
| 2004/0044665 A1 | 3/2004 | Nwabueze | |
| 2004/0059705 A1 | 3/2004 | Wittke | |
| 2004/0122844 A1 | 6/2004 | Malloy et al. | |
| 2005/0015360 A1 | 1/2005 | Cras et al. | |
| 2005/0033726 A1 | 2/2005 | Wu et al. | |
| 2005/0114757 A1 | 5/2005 | Sahota et al. | |
| 2005/0246357 A1 | 11/2005 | Geary et al. | |
| 2006/0161559 A1 | 7/2006 | Bordawekar et al. | |
| 2006/0248092 A1 | 11/2006 | Keller et al. | |

FOREIGN PATENT DOCUMENTS

EP 06 73 7607 9/2008

(Continued)

OTHER PUBLICATIONS

Hongzhi Wang, OLAP for XML Data, Sep. 2005, The Fifth International Conference on Computer and Information Technology.*

(Continued)

*Primary Examiner* — Charles Kim
*Assistant Examiner* — Kurt Mueller
(74) *Attorney, Agent, or Firm* — DLA Piper LLP (US)

(57) ABSTRACT

A system and method for analyzing and reporting data from multiple sources is provided. The system is a foundation for an analytical platform that covers not only traditional relational data, but also a new generation of extensible data formats designed for the web, such as those based on XML (FIXML, FpML, ebXML, XBRL, ACORD, etc.), as well as HTML, E-mail, Excel, PDF, and others. In a preferred embodiment, the eXtensible on-line analytical processing (XOLAP), is a scalable client/server platform that allows the multi-dimensional analysis of modern data types, as well as traditional relational data, by bringing them all into an internal common XML-based model, without the time and expense of creating a data warehouse.

17 Claims, 20 Drawing Sheets

FOREIGN PATENT DOCUMENTS

WO     PCT/US06/08446     10/2007
WO     PCT/US2006/08446     10/2007

OTHER PUBLICATIONS

OLAP Extensibility Model, Microsoft, located at http://msdn.microsoft.com/en-us/library/aa208425(v=office.11).aspx.*

EP 06 73 7607 Office Action dated Jun. 16, 2010.

B. Farias Loscio: "Managing the Evolution of XML-based Mediation Queries", Apr. 1, 2003, pp. 1-159.

Chaudhuri, S. et al.: "An overview of data warehousing and OLAP technology", ACM SIGMOD Record, Mar. 1, 1997 (10 pgs.).

Xiao-Ling Wang et al.: "XML-based data cube" vol. 5, Oct. 29, 2001, (6 pgs).

Pedersen, D. et al.: "Integrating XML Data in the Targit OLAP System", May 5, 2004, TR-8 (21 pgs).

Lionel Savary et al.: "Spatial Data Warehouse—A Prototype", Electronic Government Lecture Notes in Computer Science; LNCS, Springer, Berlin, DE. Jan. 1, 2004 (6 pgs).

Summons to Attend Oral Proceedings Pursuant to Rule 115(1) EPC of EP06737607.9; dated May 16, 2012.

Loscio, Salgado, and Vidal "Using Agents for Generation and Maintenance of Mediators in a Data Integration System on the Web"; dated Oct. 3, 2001.

* cited by examiner

| Relational Data | Extensible Data |
|---|---|
| Transaction-oriented | Web-oriented |
| Lives in relational databases | Lives in various places (web servers, file servers, BLOBs in the database, relational database, flat files, log files, etc.) |
| Has simple, regular structure | Has complex structure feature hierarchies and containment |
| Its structure changes rarely | Its structure changes frequently because the formats are self-descriptive |
| Its metadata is separate from the data | Its metadata is embedded in the data in the form of tags and attributes |

FIGURE 1

Dimension 1
Product
  VCR
    Canon
    JVC
  Camera
    Nikon
    Minolta

Dimension 2
Time Period
  Qtr 1
    Jan
    Feb
    Mar
  Qtr 2
    Apr
    May
    Jun

FIGURE 3

| Product | Time Period | Sales |
|---|---|---|
| Canon | Jan | 1000 |
| JVC | Jan | 3000 |
| Nikon | Jan | 1500 |
| Minolta | Jan | 2400 |
| Canon | Feb | 3200 |
| JVC | Feb | 4500 |
| Nikon | Feb | 1200 |
| Minolta | Feb | 900 |
| Canon | Mar | 500 |
| JVC | Mar | 1300 |
| Nikon | Mar | 2300 |
| Minolta | Mar | 1800 |
| Canon | Apr | 1400 |
| JVC | Apr | 2000 |

FIGURE 4

Table 1.

| Product | Period | Sales |
|---|---|---|
| C01 | 01 | 1000 |
| J01 | 01 | 3000 |
| N01 | 01 | 1500 |
| M01 | 01 | 2400 |
| C01 | 02 | 3200 |
| J01 | 02 | 4500 |
| N01 | 02 | 1200 |
| M01 | 02 | 900 |
| C01 | 03 | 500 |
| J01 | 03 | 1300 |
| N01 | 03 | 2300 |
| M01 | 03 | 1800 |
| C01 | 04 | 1400 |
| J01 | 04 | 2000 |

Table 2.

| Product ID | Product Name |
|---|---|
| C01 | Canon |
| J01 | JVC |
| N01 | Nikon |
| M01 | Minolta |

Table 3.

| Period ID | Period Name |
|---|---|
| 01 | Jan |
| 02 | Feb |
| 03 | Mar |
| 04 | Apr |

FIGURE 5

```
<Sales>
    <Product category="VCR" name="Canon"/>
    <Qtr1 month="Jan" sales="1000"/>
</Sales>
<Sales>
    <Product category="VCR" name="JVC"/>
    <Qtr1 month="Jan" sales="3000"/>
</Sales>
<Sales>
    <Product category="Camera" name="Nikon"/>
    <Qtr1 month="Jan" sales="1500"/>
</Sales>
<Sales>
    <Product category="VCR" name="Minolta"/>
    <Qtr1 month="Jan" sales="2400"/>
</Sales>
<Sales>
    <Product category="VCR" name="Canon"/>
    <Qtr1 month="Feb" sales="3200"/>
</Sales>
<Sales>
    <Product category="VCR" name="JVC"/>
    <Qtr1 month="Feb" sales="4500"/>
</Sales>
<Sales>
    <Product category="Camera" name="Nikon"/>
    <Qtr1 month="Feb" sales="1200"/>
</Sales>
<Sales>
    <Product category="VCR" name="Minolta"/>
    <Qtr1 month="Feb" sales="900"/>
</Sales>
<Sales>
    <Product category="VCR" name="Canon"/>
    <Qtr1 month="Mar" sales="500"/>
</Sales>
<Sales>
    <Product category="VCR" name="JVC"/>
    <Qtr1 month="Mar" sales="1300"/>
</Sales>
<Sales>
    <Product category="Camera" name="Nikon"/>
    <Qtr1 month="Mar" sales="2300"/>
</Sales>
<Sales>
    <Product category="VCR" name="Minolta"/>
    <Qtr1 month="Mar" sales="1800"/>
</Sales>
<Sales>
    <Product category="VCR" name="Canon"/>
    <Qtr2 month="Apr" sales="1400"/>
</Sales>
<Sales>
    <Product category="VCR" name="JVC"/>
    <Qtr2 month="Apr" sales="2000"/>
</Sales>
```

FIGURE 6

```
<Sales>
<Product category= "VCR" name = "Canon"/>
<Qtr1 month="Jan" sales = "1000"/>
</Sales>
```

FIGURE 7

```
<Sales>
<Product category="VCR"/>
<Product name = "Canon"/>
<Period name="Qtr1" month="Jan"/>
<Sales number = "1000"/>
</Sales>
```

FIGURE 8

| OLAP | XOLAP |
|---|---|
| Requires an analytical cube where cube dimensions have to be created manually with the aid of a database star schema | Models data sources and the analytical cube in a single step. No need for defining cube's dimensions manualy |
| Requires a data populated cube to run any aggregate functions againsts it. | Does the "data loading" and "data aggregation", including non-parametric functions, on the fly. |
| Needs to rebuild the cube for new applications, depending on how the cube was initially designed. | There is a single virtual schema that is an OLAP like structure built on top of various data sources specified by the user. The virtual schema is merely a multidimensional index that is used as a source of "building materials" for smaller analytical cubes. |
| Has size limitations due to the fact that the cube needs to be fully populated before analysis can be done | The virtual cache takes very little space and can be re-created any time from data sources that it represents. With a new application, a new small analytical cube can be easily created from the virtual cache. |
| Has limited support for data aggregation on the fly | Does aggregation on the fly, including non-parametric functions as well as any function through a special interface that supports user-defined function (UDF) plug-ins |
| Has limits imposed by the size of data sources because the data sources have to be fully loaded into the cube | Handles very large data sources by indexing them rather than loading data into the cube |
| Proprietary internal data structures and data storage | Uses XML as an internal representation of the data sources as well as the data model and the analytical model. |
| Works only with relational data sources organized into a "snow-flake" or a "star" schema | Works well with XML sources and other non-relational data sources as well as a combination of relational and non-relational data sources |

FIGURE 13

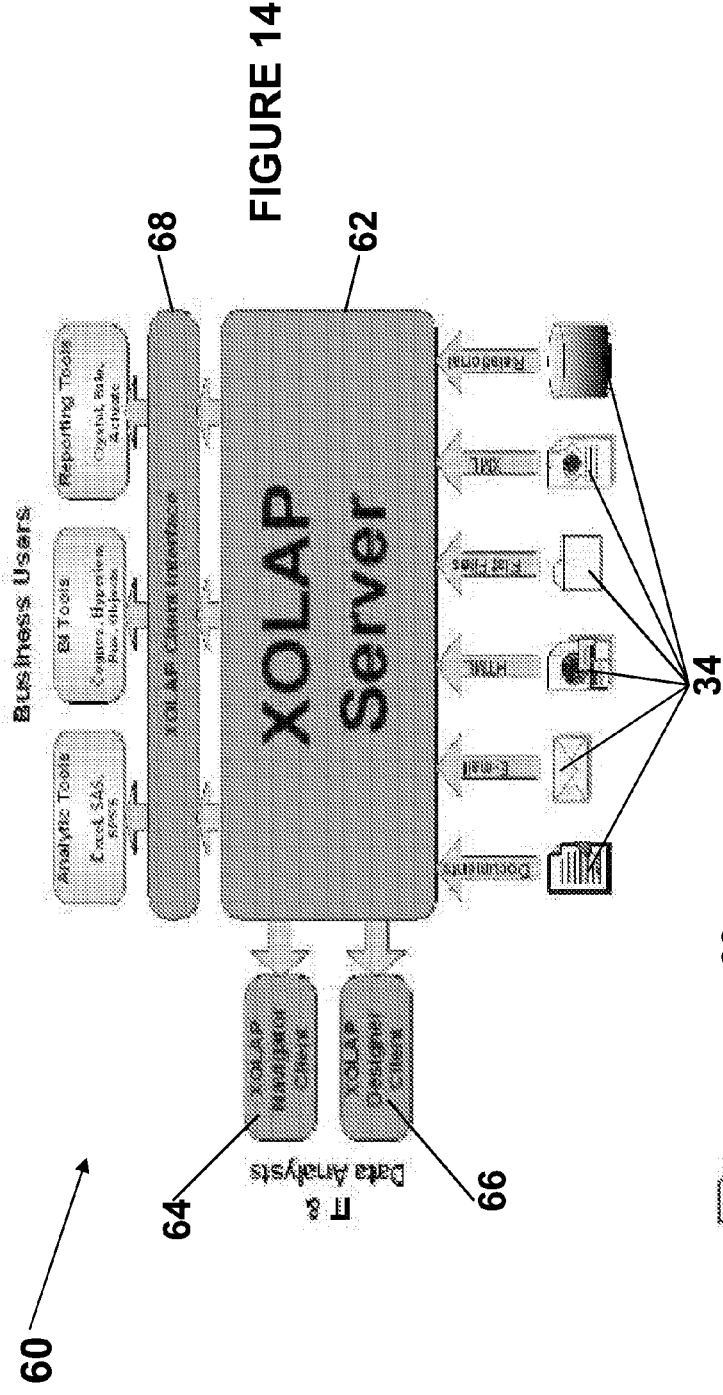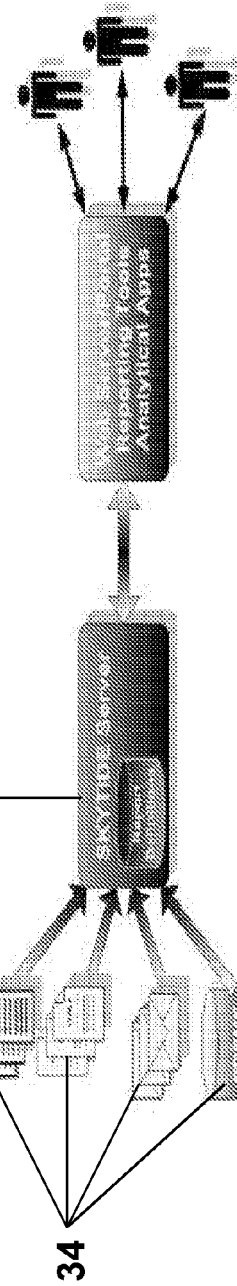

SYSTEM AND METHOD FOR ANALYZING AND REPORTING EXTENSIBLE DATA FROM MULTIPLE SOURCES IN MULTIPLE FORMATS

PRIORITY CLAIMS

This application claims priority under 35 U.S.C. §120 to U.S. patent application Ser. No. 11/370,522, filed Mar. 7, 2006 and entitled "System and Method for Analyzing and Reporting Extensible Data from Multiple Sources in Multiple Formats" which in turn claims priority under 35 U.S.C. §§119 (e) and 120 to U.S. Provisional Patent Application Ser. No. 60/659,543 filed on Mar. 7, 2005 and entitled "Analyzing and Reporting Data for Multiple Sources", all of which are incorporated herein by reference.

FIELD OF THE INVENTION

The invention relates generally to a system and method for analyzing and reporting extensible data from multiple sources in multiple formats.

BACKGROUND OF THE INVENTION

The analysis of structured relational data is well addressed with a variety of vendors offering an assortment of online analytical processing (OLAP) products. However, the new generation of data formats has significant differences from relational data, making the traditional OLAP solutions ill suited to analyze them. FIG. 1 illustrates the differences between relational data and extensible data. Typically, these new extensible data types support the interchange of information both inside and outside of a corporation. As such, they are complex, dynamic, subject to change, and highly heterogeneous. By contrast, relational data is designed to be used in a transactional environment and so are typically stable, schema-driven, unlikely to change, and highly homogeneous.

Business data volume growth exceeds our capabilities to analyze this data. An explosion in data types and data formats like HTML, XML, and others made the situation even worse by effectively preventing the traditional business intelligence application stack to operate on these new types of data in new formats. While traditional relational storage represents less than 20% of corporate data, the remaining 80% is getting increasingly more important, and businesses are trying to find ways to expand data analysis beyond relational data. There is a need to have a new generation analytical platform that can facilitate analysis of new data types and formats in an easy to use product featuring better and faster analysis, higher performance, and lower cost.

So, corporations have discovered that when they try to apply traditional analytical solutions to these new data types, a laborious and expensive step is required to "shred" them into a typical relational schema, losing the structure, flexibility and information that made them valuable in the first place. Any change comes hard and expensively. As these new extensible data types accumulate in corporations, there will be a demand to analyze them in a style and manner for which they were designed.

The industry has come full circle. In a way, the situation is reminiscent of the early 1990s when large volumes of relational data accumulated with the wide adoption of RDBMs, and vendors such as Arbor Software (Hyperion Solutions) and Business Objects introduced the concept of OLAP as an easy-to-understand way to analyze them. An analogous demand for an analytic platform will arise out of the appearance and ubiquity of these new extensible data types.

The characteristics of relational data shown in FIG. 1 are such that a traditional business intelligence (BI) application stack such as that shown in FIG. 2 works very well with relational data. However, the characteristics of the new extensible data, especially around its complexity, flexibility, and dynamic nature make it impossible to use that same BI stack and requires a new analytical platform. Thus, it is desirable to provide a new platform that handles the extensible data and it is to this end that the present invention is directed.

SUMMARY OF THE INVENTION

The system and method for analyzing and reporting data from multiple sources makes it possible for its users to understand their extensible data. The system is a foundation for an analytical platform that covers not only traditional relational data, but also a new generation of extensible data formats designed for the web, such as those based on XML (FIXML, FpML, ebXML, XBRL, ACORD, MISMO, etc.), as well as HTML, E-mail, Excel, PDF, and others. In a preferred embodiment, the eXtensible on-line analytical processing (XOLAP), is a scalable client/server platform that allows the multi-dimensional analysis of modern data types, as well as traditional relational data, by bringing them all into an internal common XML-based model, without the time and expense of creating a data warehouse. The system, from the outside, looks like a standard OLAP server so that the existing reporting tools and analytical applications designed for the traditional OLAP system can be used with the XOLAP system.

The system may be used for various industry solutions including, for example: the analysis of complex XML data streams such as ACORD, FpML, MISMO, FIXML, SWIFT, HL7, or RosettaNet, with transaction data to improve their operational performance; multi-channel and agent analytics for the Financial Service and Insurance industries to better target and increase revenue opportunities; financial transaction value chain analytics in the financial services and banking industries to streamline execution and settlement; customer interaction analytics for eCommerce and multi-channel communications to increase customer loyalty and cross-sell/up-sell opportunities; compliance reporting and monitoring for cross-industry regulations such as Sarbanes-Oxley, or industry specific regulations to understand risk positions and identify risky transactions; and healthcare insurance and claims value chain analytics to eliminate processing errors and increase cash flow.

The system combines together various data sources and business intelligence applications, analytical and reporting tools enabling analysis of data that does not fit a traditional relational data model and therefore does not fit a traditional business intelligence (BI) application stack.

Thus, in accordance with the invention, an extended online analytical server is provided. The server has one or more adaptors, each adaptor converting one or more pieces of data from a particular data source having a particular data format into the common data format and an aggregator that aggregates the one or more pieces of data from the data sources to generate aggregated pieces of data. The server also has a virtual schema generator that generates a virtual schema from the aggregated pieces of data and an indexing engine and a scheduler that update the virtual schema when new pieces of data are received by the aggregator. The server also has an analytical cube generator that generates an analytical cube based on the virtual schema and an application programming interface to an external tool wherein the application programming interface permits the external tool to access the piece of data in the analytical cube.

In accordance with another aspect of the invention, a computer-implemented method for analyzing and reporting data from multiple data sources is provided. During the method, one or more pieces of data from one or more data sources, wherein the data sources include at least relational data sources and non-relational data sources, are converted into a common data format. The method also includes the step of generating an analytical cube based on the one or more pieces of data in the common data format using a declarative language and providing an application programming interface to an external tool wherein the application programming interface permits the external tool to access the piece of data in the analytic cube.

In accordance with another aspect of the invention, an apparatus for analyzing and reporting data from multiple data sources is provided. The apparatus has an adaptor that allows a data source with one or more data items having a particular data format to be loaded into an extended online analytical processing system that converts the data items from the different data sources into a common format and generates a multidimensional analytical cube based on the data items. The apparatus also has an application programming interface to an external tool wherein the application programming interface permits the external tool to access the piece of data in the analytical cube.

In accordance with yet another aspect of the invention, a computer-implemented method for generating dimensional analytical models from extensible data is provided. In the method, one or more pieces of data from one or more data sources are received wherein the data sources include at least one of a relational data source and a non-relational data sources. The one or more pieces of data from the one or more data sources are converted into a common data format. Using the one or more pieces of data with the common data format, a dimensional analytical model is formed wherein forming the dimensional analytical model further comprises using a declarative language to describe the dimensional analytical model.

BRIEF DESCRIPTION OF THE DRAWINGS

FIG. 1 illustrates the differences between relational data and extensible data;

FIG. 3 illustrates an example of a dimension hierarchy for an online analytical processing system;

FIG. 4 illustrates an example of a fact table for an online analytical processing system;

FIG. 5 illustrates an example of an operational store for an online analytical processing system;

FIG. 6 illustrates an example of set of transactions used for creating a fact table;

FIG. 7 illustrates an example of fact schema;

FIG. 8 illustrates a schema generated by the fact schema shown in FIG. 7;

FIG. 13 shows a comparison of typical online analytic processing system and the extendable online analytic processing system;

FIG. 14 illustrates an example of an implementation of the extendable online analytic processing system;

FIG. 15 illustrates an example of more details of the XOLAP server shown in FIG. 14;

DETAILED DESCRIPTION OF A PREFERRED EMBODIMENT

Figure 2:
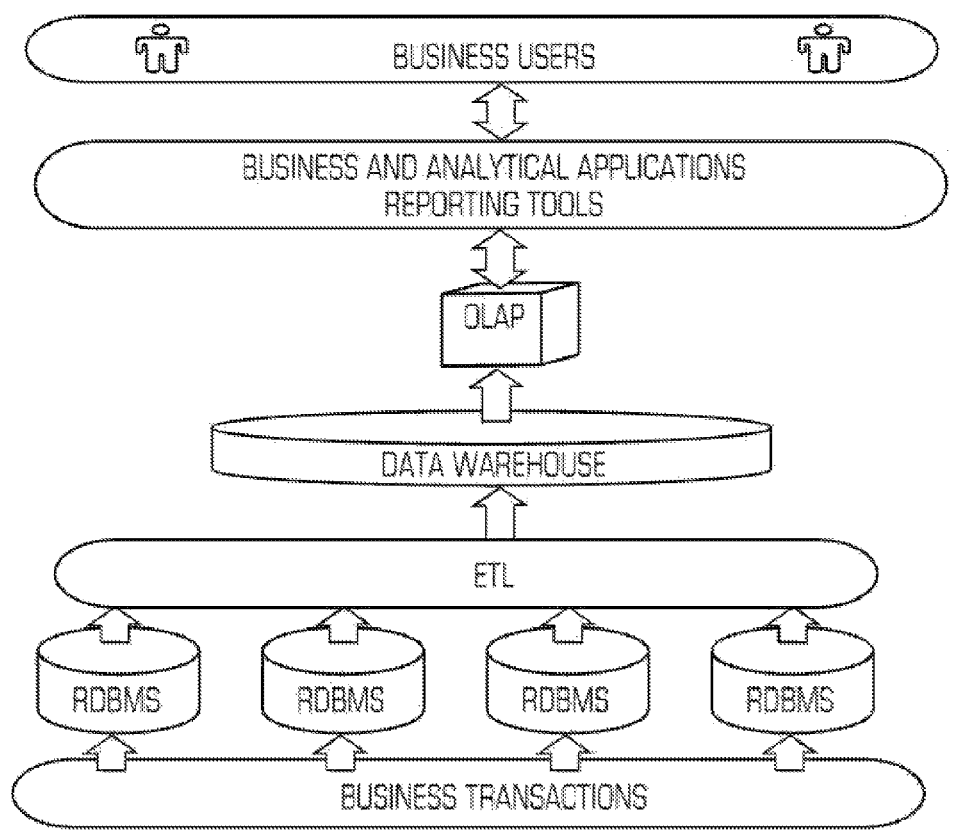
FIG. 2 illustrates an example of a typical online analytical processing system for relational data.

The invention is particularly applicable to a client/server software-based XOLAP system and it is in this context that the invention will be described. It will be appreciated, however, that the system and method in accordance with the invention has greater utility since the XOLAP system can be implemented in other manners that are within the scope of the invention. Prior to describing the XOLAP system in accordance with the invention, an overview of online analytic processing (OLAP) is provided as these concepts are used as part of the XOLAP system.

Online Analytic Processing

Online Analytical Processing (OLAP) features multidimensional hierarchies organized in a cube to facilitate multidimensional data navigation. The cube permits someone to slice and dice the cube as a way to view data from different angles defined by the OLAP cube and permits someone to drill down as a way to navigate from summary data down to detail data within the OLAP cube. A typical OLAP user has to build the cube (define the cube's fact, dimensions and hierarchies) by identifying the commonly used clauses in the data queries intended to run against the cube. For example, for the query "show sales numbers by product, by region, by time period", "sales number" becomes the subject of the analysis (the fact), while "product", "region", and "time period" become the dimensions. After the cube dimensions are defined, data has to be loaded into it in accordance with special rules. A number of aggregations is then performed on this data where the aggregates correspond to dimension hierarchies. For example, sales numbers for different months are aggregated into sales numbers for different quarters (See FIG. 3 for example), and quarters are aggregated into a year. The dimension hierarchies are partially built during the process of data loading as well as manually. For example, a product hierarchy can be built during the process of loading data into the cube by specifying the rule like "Canon, JVC should become children of VCR" as shown in FIG. 3. Alternatively, VCR can be introduced in a product hierarchy at a later time by the analyst who wants to aggregate data from Canon, JVC into a single VCR category.

The process of loading data into a cube relies on a certain type of data model associated with the data source (known as a star schema or a snowflake schema). The schema is built around a fact table that contains all the possible dimension permutations that have association with a data point (a fact) such as is shown in the table of FIG. 4. In this example, the dimensions are product, time period and sales in FIG. 4. Such an organization of data is highly inefficient from the storage standpoint and is being used primarily for analysis and reporting purposes. Usually there is a process of moving data from the transactional store (operational store) into a datawarehouse for reporting. This process of data extraction, transformation, and loading into a fact table is called ETL and has to precede the process of loading data into the actual multidimensional cube or creating a multidimensional index (OLAP). The operational (transactional) data store used as a source of data for a datawarehouse is based on a different data model called entity-relationship model (E-R model) and the ETL process is a way to map data stored in E-R model into a fact table based on a star/snowflake data model. The operational store based on the E-R model used to feed a fact table in FIG. 4 would look like the tables shown in FIG. 5. The intent of E-R based data model is to reduce the storage requirements by reducing data redundancy (using codes in place of product names, for example).

The star and the snowflake schema is a corner stone of any OLAP technology. This heavy dependency makes OLAP processing of non relational data very difficult. In particular, if the source data is produced as a number of XML transactions instead of the three tables in FIG. 5, it could look like the data shown in FIG. 6. The problem is that creating a fact table based on transactions in FIG. 6 is a much more difficult task then creating a fact table (FIG. 4) out of the relational database (FIG. 5). In particular, the task of loading XML transaction(s) into a fact table requires programmatic effort and every little change in the transaction XML schema will require even more work. For example, a schema like that shown in FIG. 7 could become the schema shown in FIG. 8. Now, an XOLAP system that overcomes these problems with typical OLAP systems will be described.

Figure 9:
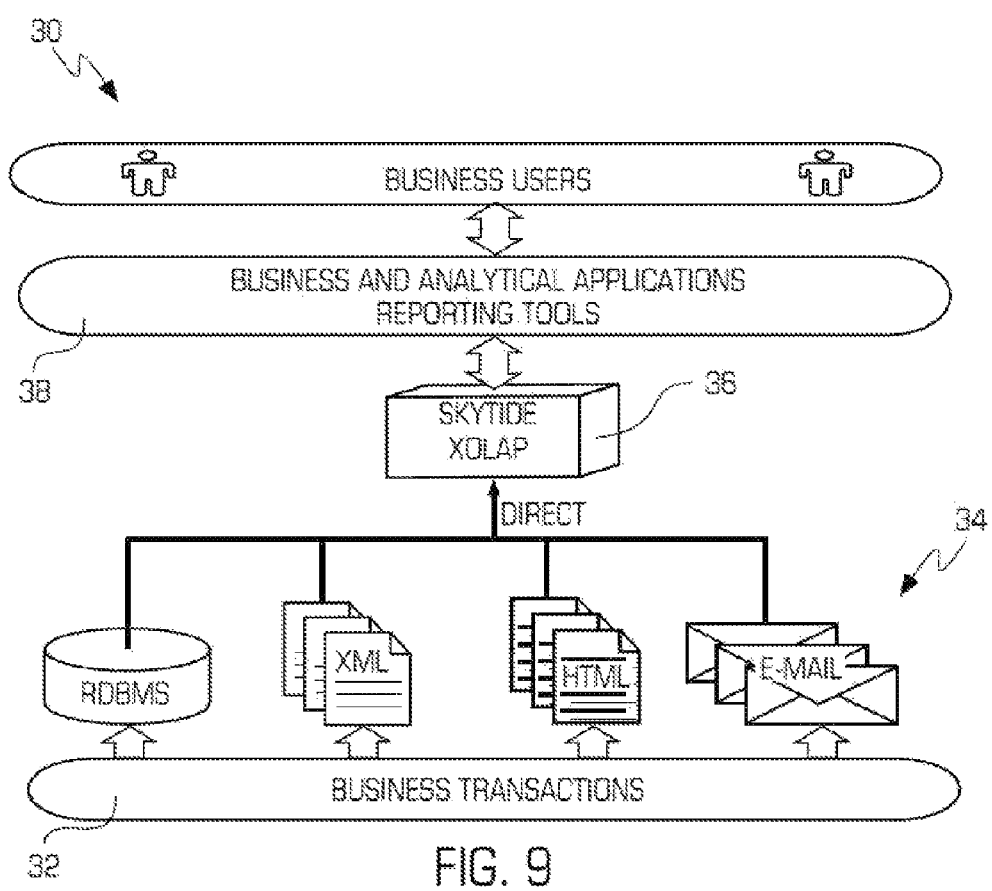
FIG. 9 illustrates an example of an extendable online analytical processing system in accordance with the invention for use with extendable data.

FIG. 9 illustrates an example of an extendable online analytical processing system 30 in accordance with the invention for use with extendable data. The system addresses the problem of timely analysis and reporting on data across multiple rapidly changing data sources in various formats. Whereas existing analytical and reporting solutions rely heavily on datawarehouses and datamarts as a way to consolidate data coming from different data sources into a unifying data model best suitable for analysis and reporting, the process of creating a data model for a data warehouse or a datamart is an extremely difficult and laborious process and the process does not work with data sources that do not reside in relational databases (RDBMS) or change frequently like most of the new data formats like XML and HTML. This limitation of typical systems is best addressed by the XOLAP system. The XOLAP system does multidimensional/multivariant analysis on tagged data like XML, HTML, e-mail, unstructured text, relational. The system also features one-step analysis that covers all three elements of the BI application stack—ETL, data modeling, and OLAP modeling. Furthermore, the XOLAP system plugs into existing reporting tools and analytical applications like Excel, SAS, and SPSS.

As shown in FIG. 9, a plurality of business transactions 32 that are stored in different data sources 34 having potentially different data formats, such as for example the relational database management system, XML, HTML and email shown, may be loaded directly into an XOLAP server 36 that performs at least ETL, data modeling, and OLAP modeling on the disparate data sources having the different data formats. The output from the XOLAP server 36 may then be input into various typical business and analytic application reporting tools 38 so that a business user can access the data even when the data is contained in an extendible data format.

The XOLAP system targets the problem of creating multivariant (multidimensional) cubes like OLAP directly on top of data sources bypassing the process of creating a star/snowflake data model. This approach works for both relational and non-relational data sources and is based on an XOLAP virtual schema that replaces the star/snowflake data model required by OLAP. The XOLAP virtual schema characteristics include that it is XML based, pulls the data from various data sources together without physically moving the data and is fully automated by utilizing the existing structure of the data sources involved.

Figure 10:
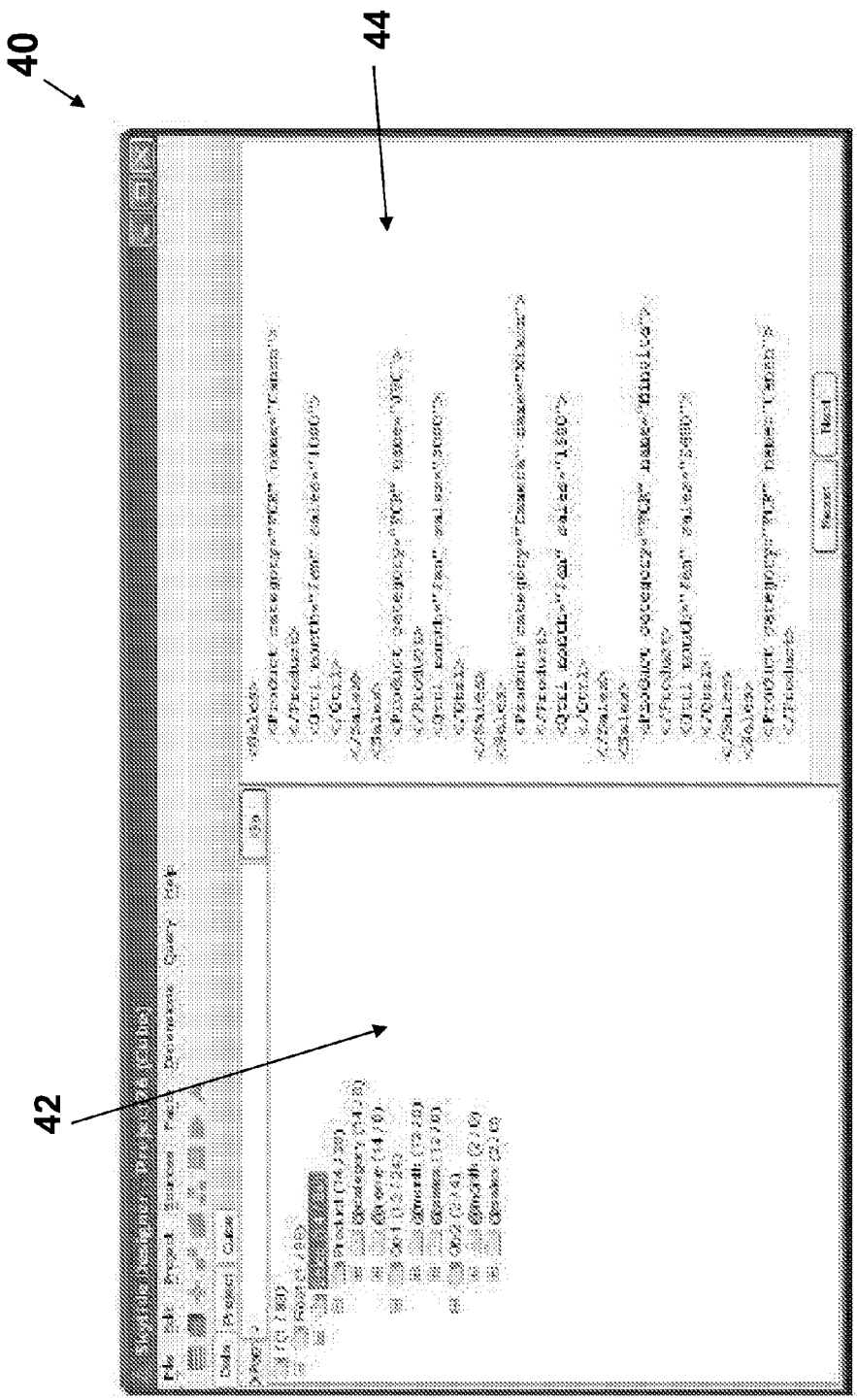
FIG. 10 illustrates an example of a user interface for generating a virtual schema for the system shown in FIG. 9.

For example, for the transactions shown in FIG. 5 above, when they are processed with the XOLAP server 36, the server 36 creates a virtual schema. FIG. 10 is an example of a user interface 40 for generating a virtual schema for the system shown in FIG. 9. The virtual schema for the transactions shown in FIG. 5 is shown in a left-hand pane 42 of the user interface. The schemas of individual transactions (shown in a right hand pane 44 of the user interface) are effectively aggregated into one while maintaining the cardinality of each tag and each attribute in the data source. For example, the element "Sales (14/84)" in the virtual schema (shown highlighted) means that the source data (on the right hand side) has 14 instances of the tag "Sales" and 84 other tags and attributes underneath the "Sales" tag. In this example, the other tags and attributes are 14 instances of "Product" plus 14 instances of "@category" plus 14 instances of "@name" plus 12 instances of "Qtr1" plus 12 instances of "@month" plus 12 instances of "@sales" and another 2 instances of "Qtr2", 2 instances of "@month" and 2 instances of @sales for a total of 84 other tags.

The virtual schema is a representation of the source data through virtual transformations which the user defines to create a suitable schema for analysis. The virtual transformations include selection, linking, renaming, and type conversions. The XOLAP cubes are built on the virtual schema as if it were a set of physical documents, although the virtual schema is never actually materialized. Instead, cube data requests are transformed into source data requests by the virtual schema. The source data requests are processed either directly against the data sources or indirectly through a cache.

The virtual schema used by the present invention is different from other XML-based data mapping approaches in purpose, specification, and implementation. In purpose, rather than defining a template for result data, the virtual schema simplifies cube building. In specification, rather than starting with a schema which is then "filled in" with data access requests, XOLAP virtual schemas are constructed incrementally by virtual schema operators such as selection, linking, renaming, and type conversion. In implementation, rather than providing a mechanism for data retrieval, the virtual schema drives construction of cube data structures in such a way that source access can be minimized and optimized. This approach works on any data source that can be interpreted as tagged data. Thus, data in any type, including text documents can always be interpreted as tagged data. An example of transforming relational data into tagged data is illustrated by FIG. 6, where XML transactions are the result of transforming data from FIG. 4. While transforming any data source into tagged data is a trivial proposition, same is not true when it comes to transforming any data into a relational model.

The XOLAP system allows optimizations which are not possible by systems which do not have its powerful, unified data model. These optimizations include but are not limited to source data access patterns, caching, compression, and indexing. As motivation for this topic, consider the dimension to an XOLAP cube. It may be possible for the XOLAP server to perform this request by only incrementally modifying its data structures, and possibly without accessing data sources at all. By contrast, an OLAP cube would have to be completely respecified and rebuilt.

The XOLAP system can effectively operate on data of any type and any format including relational databases, while OLAP technologies can only operate on relational or tabular data and require complex transformations of non relational and non tabular data into relational.

Returning to FIG. 10, the virtual schema on the left-hand side pane 42 is similar to the OLAP-style multidimensional hierarchy from FIG. 3. In addition, it takes very little effort to create such hierarchy (or a cube) using the XOLAP virtual schema. Since the virtual schema is XML based, it is possible to use standard languages like xPath or xQuery to operate on this schema to create a cube. The virtual schema of the XOLAP system supports the use of any programming language on the virtual schema including but not limited to Java, C++, Perl, etc. since the XOLAP system is not limited to an implementation based on any particular programming language.

The XOLAP system creates multidimensional cubes by executing commands from a declarative language like xPath against the virtual XML schema unlike a standard OLAP approach of specifying the cube manually or by using complex data loading rules. Thus, the XOLAP system drastically reduces the complexity of creating a multidimensional cube by allowing it to be done through the use of a simple declarative language like xPath. An example of a method for generating a virtual schema using xPath is now described with reference to FIG. 11.

Figure 11:
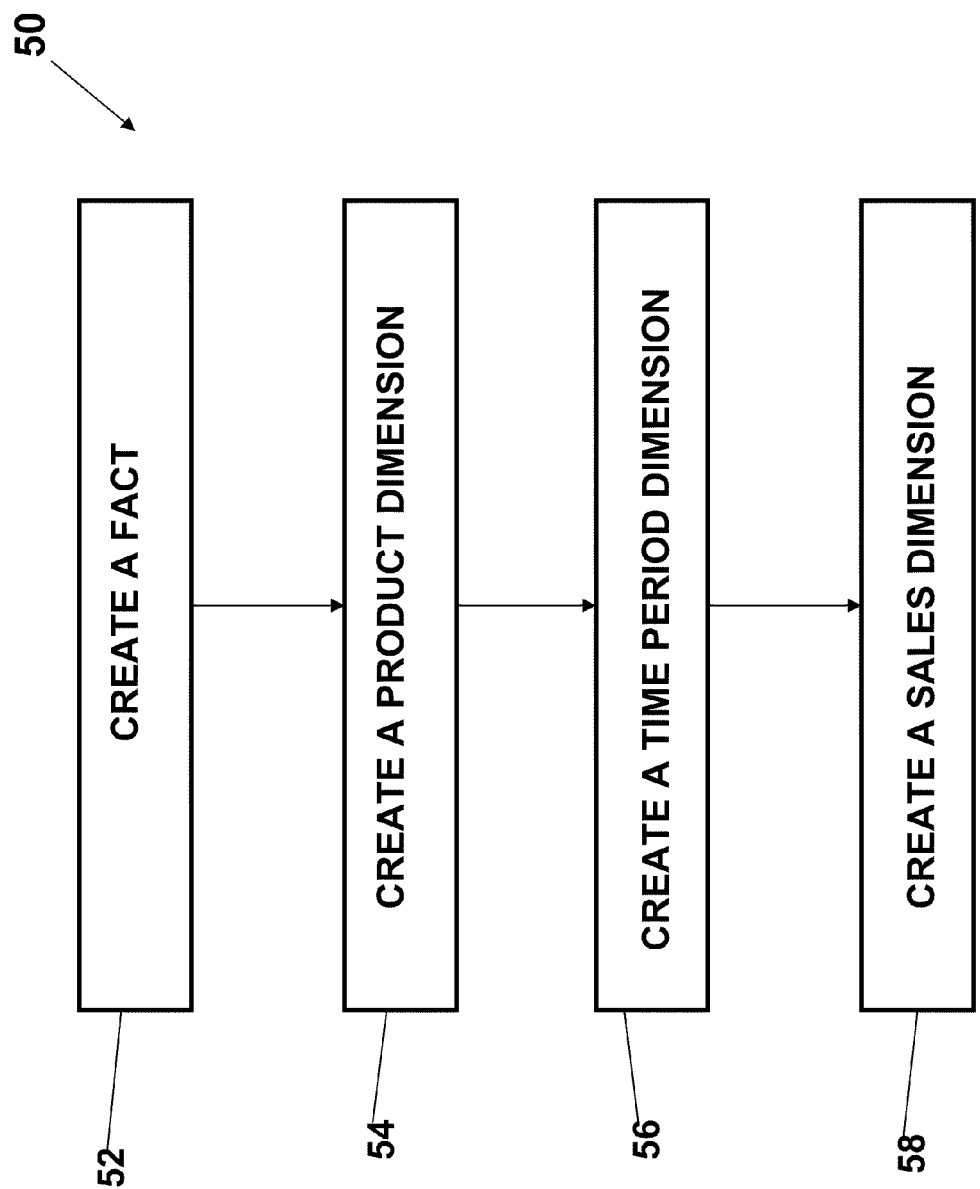
FIG. 11 illustrates a method for generating a multidimensional cube in accordance with the invention.

FIG. 11 illustrates a method 50 for generating a multidimensional cube in accordance with the invention using the xPath language similar to the one shown in FIG. 3. In step 52, a fact may be created using the XOLAP system. The step of creating a fact is a process of subsetting the virtual schema to identify the element of the schema to run against with to run the analysis. In the example from FIG. 10, the identified element is the "Sales" tag and choosing this tag using XOLAP results in the generating of the following xPath expression:
/Root/Sales The xPath expression specifying the XOLAP fact creates an anchor in the virtual schema that acts as a reference point for dimensions that are also defined through xPath expressions but relative to the fact rather then the entire virtual schema.

In step 54, a product dimension may be created. The creating of a product dimension consists of two steps including:
 (a) creating a product category by using xPath expression. For example, for the cube shown in FIG. 3, a product category on the "@category" attribute may be created
 Product/attribute::category
 (b) creating a product hierarchy by using xPath expression on the "@name" attribute
 Product/@name In step 56, a time period dimension for the cube is created wherein creating a time period dimension also consists of two steps including:

(a) use the following xPath expression to get to both Qtr1 and Qtr2
 Qtr1/@month|Qtr2/@month
 and the following xpath expression to introduce month classification
 if (.="Jan") then "Qtr1"
 else if (.="Feb") then "Qtr1"
 else if (.="Mar") then "Qtr1"
 else "Qtr2"
 (b) create a time hierarchy by using xPath expression on the "@month" attribute
 Qtr1/@month|Qtr2/@month Step (a) not only "extracts" the appropriate data from the virtual cache (the first xPath expression), but it also defines a certain transformation (the second xPath expression.)

Figure 12:
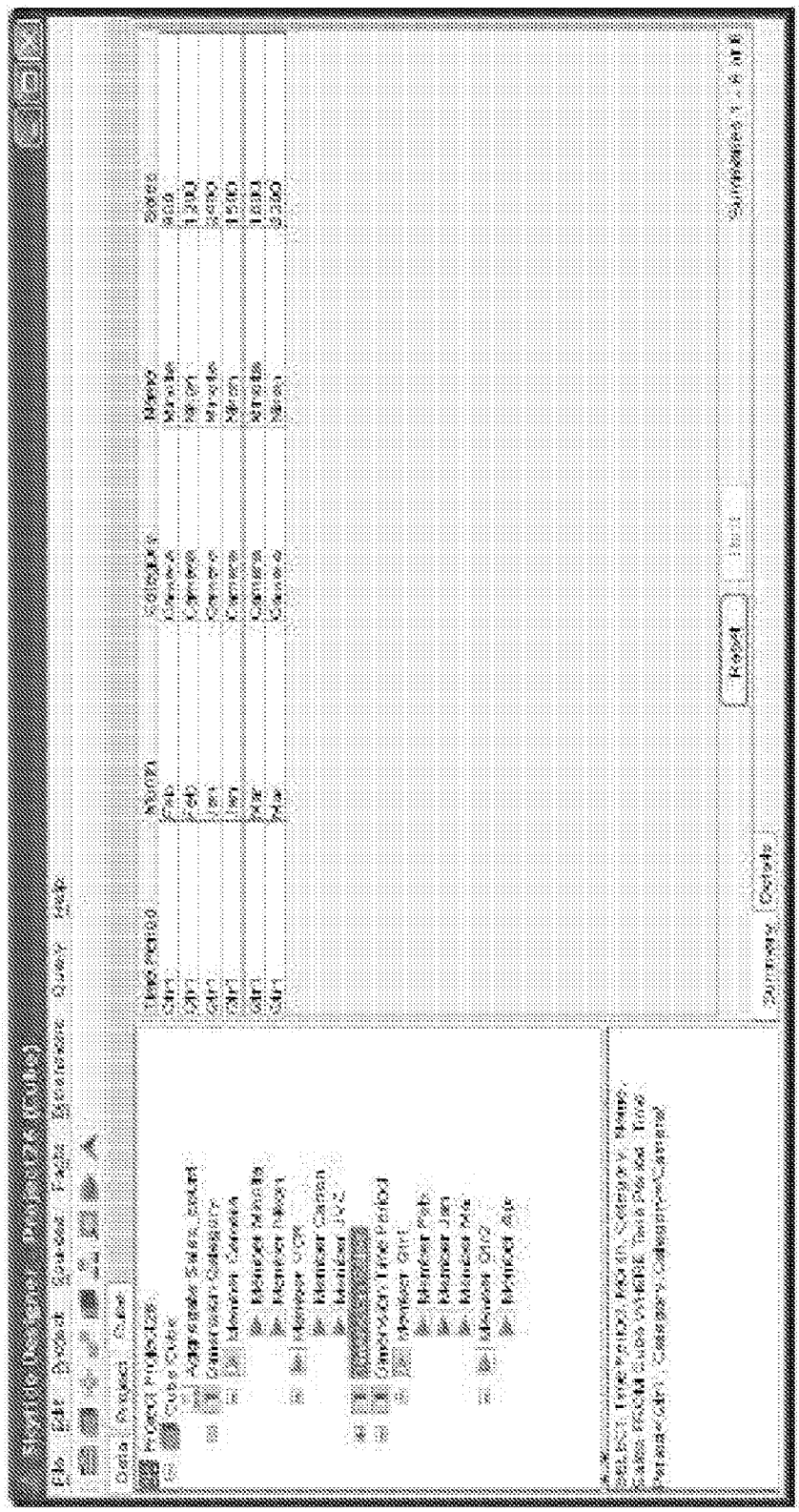
FIG. 12 illustrates an XOLAP cube for the system in FIG. 9.

In step 58, a sales dimension is created wherein the creating of a sales dimension is a matter of defining an xPath expression that pulls sale numbers from both Qtr1 and Qtr2
 Qtr1/attribute::sales|Qtr2/attribute::sales The end result is a fully functional OLAP like cube such as that shown in FIG. 12.

Every element of the cube in FIG. 11 is defined through one or more xPath expressions and supports all the features of a standard OLAP cube including slicing and dicing, drill down, and data aggregation. The XOLAP cube differs from the OLAP cube in a variety of ways:

Facts (Multiple Scenarios—Single Cube)

The fact in the OLAP cube is rigidly defined as a numeric data cell of a certain type (sales data, or revenue data, or else). The multiple facts in the OLAP cube require defining a special dimension Measures or Scenarios or both that effectively create multiple instances of the cube for each fact type. Multidimensional analysis of multiple facts within the same cube is not possible. In contrast, due to the way the XOLAP cube elements are defined, dimensions and data cells are treated equally in the XOLAP cube (analogous to different facts in the OLAP cube) and can be analyzed at the same time.

Complex Sequence—Valued Dimensions

Because XOLAP cubes are defined using XPath expressions, and because in general XPath expressions can return a sequence of atomic or complex-valued results, dimensions are inherently multi-valued and complex. In all situations where OLAP cubes require atomic scalar values, XOLAP allows complex sequences.

Multi-valued dimensions allow N:N relationships between facts and dimension members, further simplifying modeling. Complex types allow creation of dimensions on complex data types.

Attributes (Attributes and Data are Equal)

Operating on data attributes in the OLAP cube is extremely difficult. A separate attribute dimension has to be built for every attribute type (color, cost, weight) imploding the size of the cube. In contrast, the XOLAP cube treats data and data attributes equally because of the way the elements of the XOLAP are defined and therefore allows simultaneous analysis of data and data attributes.

Links (Data Aggregation is Simple)

Operating on multiple data sources in the OLAP cube requires bringing them together in a star/snowflake schema of a datawarehouse/datamart. This requires knowledge about complex relationships that exist among the data sources. In contrast, the XOLAP cube uses xPath to bring together different elements of the virtual schema into a single dimension or an XOLAP fact drastically simplifying the data aggregation process.

FIG. 13 shows a comparison of typical online analytic processing system and the extendable online analytic processing system. In accordance with the invention, the XOLAP system uses XML as an internal representation of the data sources as well as the data model and the analytical model. Though it is true that XOLAP system works well with XML sources, it works equally well with other non relational data sources as well as a combination of relational and non relational data sources. The strength and uniqueness of XOLAP system is in its ability to model both the data sources and the analytical cube in a single step. It is important to note that XOLAP does not create a data model or an analytical model automatically but it rather aids the process of creating such models, dramatically simplifying and speeding up this process.

Since XOLAP system does not rely on bringing data from data sources into an intermediary storage like a dataware-house or a datamart, the solution can handle extremely large data volumes.

The XOLAP system also does data aggregation on the fly. More importantly, it is not just the aggregation that the product can do, but also non-parametric functions. In fact, it provides support for any function through a special interface that supports user-defined function (UDF) plug-ins.

The XOLAP system also does the "data loading" and "data aggregation", including non-parametric functions, in a single step on the fly. Despite the OLAP look and feel, the product's architecture is quite different from traditional OLAP products requiring a fully populated cube before running any functions against it.

The XOLAP system provides a way to build a free-form analytical cube As soon as there is a new analytical application, the cube might need to get rebuilt, depending on how the cube was initially designed. XOLAP first creates a virtual schema that is already an OLAP like structure built on top of various data sources specified by the user. The virtual schema is merely a multidimensional index that is used as a source of 'building materials" for "analytical cubes".

The SKYTIDE virtual schema is just an index and takes very little space and can be re created any time from data sources that it represents. For each new analytical application, a new small analytical cube can be easily created from the virtual schema.

XOLAP applies the benefits of online analytical processing (OLAP) to the XML data model. This enables analysis of previously un-analyzable information, as well as drastically expands the capabilities of commercial analytical applications by allowing them to operate on tagged data sets. XOLAP supports multidimensional OLAP-style analysis, handles tagged and relational data sources, relates data across data sources, presents results to standard BI tools. Now, an example of an implementation of the XOLAP system is described in more detail.

FIG. 14 illustrates an example of an implementation of the extendable online analytic processing system 60 wherein the system includes an XOLAP server 62. As shown, data from one or more different data source 34, such as for example documents, email messages, HTML documents/code/files, flat files, XML documents/code/files and relational data may be loaded into the XOLAP server 62. For purposes of performing IT and data analysis, the system may include an XOLAP navigator client 64 and an XOLAP designer client 66 coupled to the XOLAP server 62 wherein each client preferably may be a software application that may or may not be executed by the same server as the XOLAP server 62. Examples of the designer user interface are shown in FIGS. 10 and 12 above. The designer 66 permits a user to load data into the XOLAP cubes. The XOLAP navigator is a read only user interface that facilitates access to data within the multi-dimensional model. The XOLAP navigator allows user to choose a subset of dimensions and dimensional elements to form a specific view (or slice) of the data in the cube so that the navigator is a tool to support ad-hoc reporting after the multidimensional model is built and populated with data. The XOLAP system 60 may further comprise a XOLAP client interface 68 which is an application programming interface (API) that permits other existing applications and tools to interface with the XOLAP system 60, such as analytic tools, BI tools or reporting tools. Thus, the XOLAP system 60 receives data in different formats, converts the data into a common format and then provides interfaces to typical analytical and BI tools so that the data from the various data sources can be analyzed.

In an example of the data analysis system using the invention, Skytide develops and markets a complete software package consisting of XOLAP Server, XOLAP Designer, XOLAP Navigator, XOLAP SDK, and XOLAP Plug-ins for Excel, SAS, and SPSS. XOLAP serves the pressing need for analysis of rapidly expanding amounts of complex and dynamic business data.

As shown in FIG. 15, the XOLAP server 62 aggregates data from various sources 34 into an XML-based cache and makes it available for analysis and reporting. It works with multiple data sources including both relational and non relational and enables business users to instantly generate sophisticated reports across multiple sources using a web/server portal, existing reporting tools or analytic applications.

Figure 16:
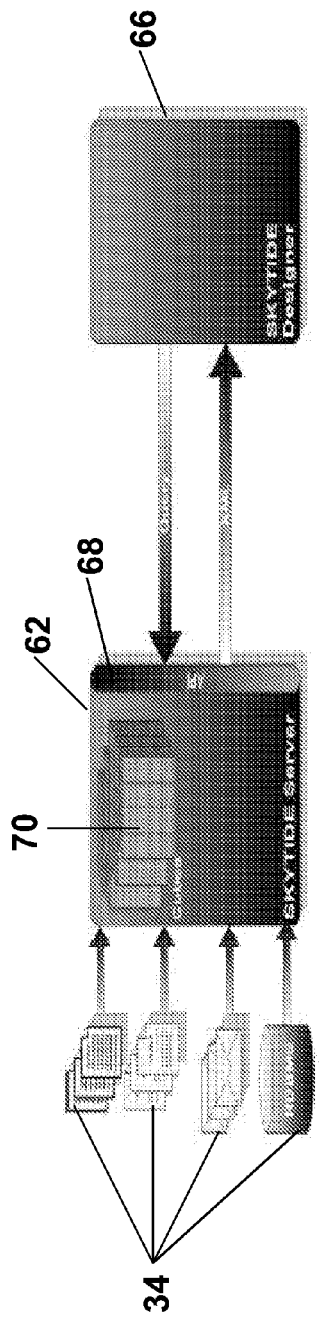
FIG. 16 illustrates an example of more details of the XOLAP designer shown in FIG. 14.

As shown in FIG. 16, the system uses the designer 66 to quickly define analytical models directly from data sources such as one or more cubes 70. To accomplish this task, the designer 66 may generate a query and send the query to the server 62 that sends XML back to the designer.

Figure 17:
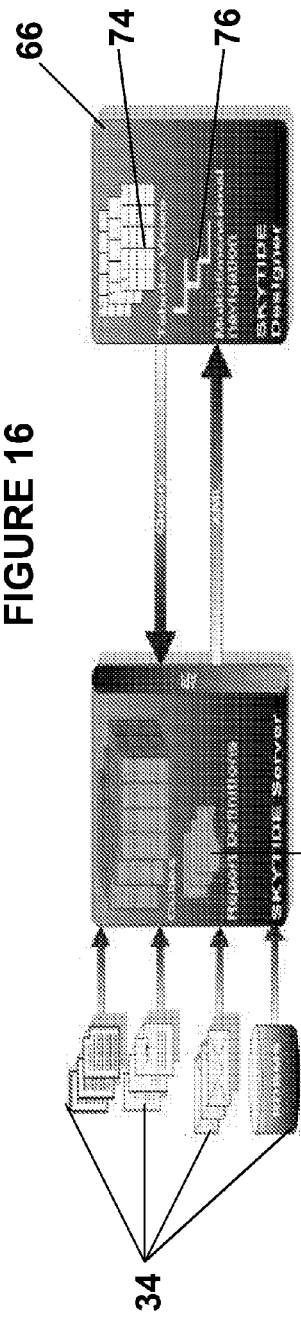
FIG. 17 illustrates an example of more details of the XOLAP designer shown in FIG. 14 used for report creation.

As shown in FIG. 17, business analysts create reports using multidimensional navigation. In particular, the server 62 may store one or more report definitions 72 and the business analyst sees the tabular views 74 and multidimensional navigation 76 provided by the server 62 to the designer 66.

Figure 18:
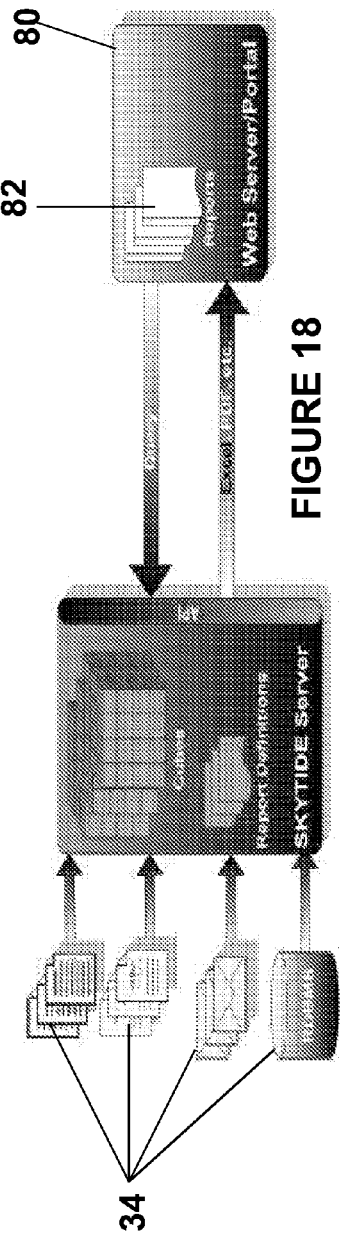
FIG. 18 illustrates an example of more details of the XOLAP server that generates reports.

As shown in FIG. 18, the server 62 makes reports available to business users as Excel spreadsheets, Excel pivot tables, PDF or others using a web server/portal 80 that generates a set of reports 82 for the business users. It is important to note that since the internal data representation in XOLAP server is XML, reports are generated in XML as well while the desired output format is achieved through the use of XSLT. Now, more details of the XOLAP server 62 is described.

Figure 19:
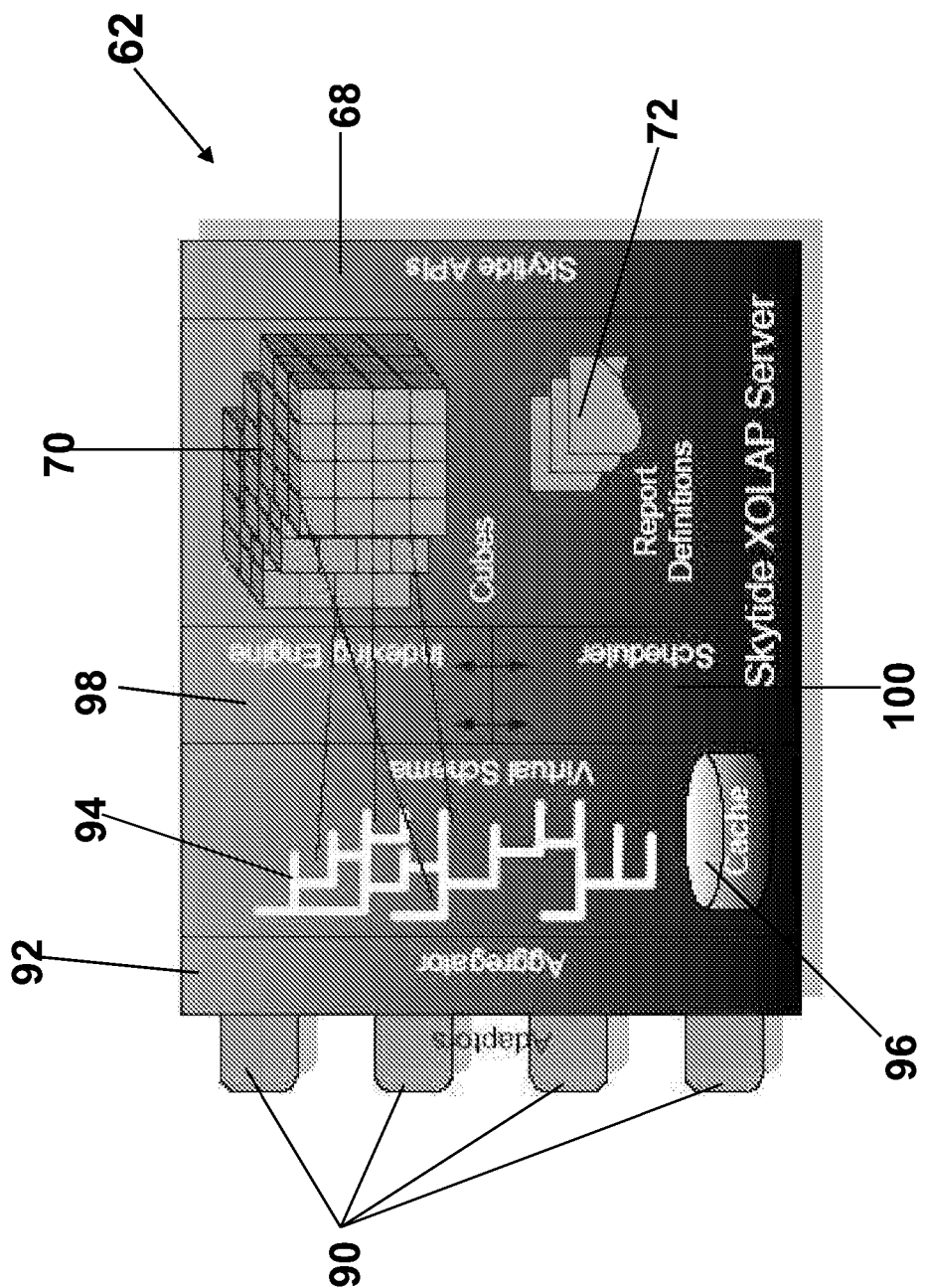
FIG. 19 illustrates more details of the XOLAP server.

FIG. 19 illustrates more details of the XOLAP server 62. The server may include a set of adaptors 90, an aggregator 92, a virtual schema generator 94, a cache 96 (that may be implemented as a software implemented cache and may store the virtual schema), an indexing engine 98 and a scheduler 100. In a preferred embodiment, these elements of the XOLAP server 62 are implemented as piece of code that are executed by a processor to achieve the results. In operation, the XOLAP server 62 connects to a data source by using Skytide XOLAP adaptors 90. A typical adaptor is capable of pulling data out of a specific data source like a web server, an e-mail server, a file server, a file, a file directory, a database, an ERP system, or others and converting this data from its native form like HTML, text, e-mail, XML, PDF, and others into the XML based virtual schema. The virtual schema component 94 of the Skytide XOLAP server 62 also has a scheduler 100 to facilitate incremental updates to the virtual schema triggered by changes in the data sources that are performed by the indexing engine 98. As shown, the virtual schema 94 is used to generate the multidimensional cubes 70.

The XOLAP server 62 architecture is based on: XML multidimensional model (cubes) that use standard XPath language and support relational and non relational data; an end-to-end XML data model that enables automation and optimization, build cubes directly from data sources and provides incremental updates and schema changes; and virtual schemas that provide flexible data integration, seamless creation of XML cubes and incremental updates for both data and data structure.

The XOLAP system 60 in accordance with the invention provide many benefits. Those benefits include: the instant creation of analytical models and reports with no ETL/Datawarehouse overhead, intuitive modeling and navigation based report generation; a flexible extensible architecture that evolves with changing needs of an organization, makes it easy to add new data sources and data formats and provides seamless integration with existing analytical and reporting tools; and a system that is highly complimentary to existing production environment since there is no need to move the data, no change to existing data and no need to model the data. The XOLAP system is superior to OLAP in its data aggregation capabilities by pulling together multiple data types in a consistent manner; in its ability to reach new data types without "shredding" (mapping to the star/snowflake schema); in its rapid development capabilities where first results come quickly, no datawarehouse is needed, and change is easy. Now, several examples of how the XOLAP system may be used for different business intelligence operations and functions (including path analysis, entity matching and identification of similar elements in hierarchies) is described.

Entity Matching Example

The XOLAP system permits entity matching that is very difficult for typical business intelligence systems. In particular, the XOLAP system can process (using the analytical model described above) a collection of e-mails or HTML pages or newsgroup messages or all of the above to uncover statistically significant co-occurrences of different entities and to chain them together into more complex relationships. For example, an individual A is related to an individual B because they happened to be at the same place at the same time and there is a statically significant number of such occurrences for individual A and B. By creating slices/dimensions through the available data, the XOLAP system permits a user to discover the co-occurrence data that would be very difficult to discover using typical BI systems.

Path Analysis Example

The XOLAP system also permits path analysis to occur. In particular, the XOLAP system can process a huge set of events to uncover collections of events that lead to a certain outcome and to point out specific characteristics of such collections responsible for this outcome. For example, an illegal insider trading event could be uncovered by exercising Skytide's path analysis across all insider transactions by identifying the most common triggering event for such transactions.

For example, a simple question of "How to find all call routes generated during the day within a call center and calculate their frequency?", will require, with typical BI systems, a professional software developer for a number of hours/days with the result of this work being a one-off solution not suitable for variations of the same question. In contrast, a business analyst using the XOLAP system is able to accomplish the same task in less than 10 minutes and produce a reusable analytical model and reports, aka an analytical application around "path analysis".

For example, the XOLAP system can be used to perform path analysis for speech applications. The analytical applications for the speech application may include:

1. Do you know how callers interact with the speech application beyond simple statistics such as the number of complete calls, incomplete calls, call rates, etc?
   <!--[if !supportLists]-->• <!--[endif]-->Do you know the most traveled routes in your speech application?
   <!--[if !supportLists]-->• <!--[endif]-->What are the characteristics of these routes (call length, amount of time spent on each prompt, interactions with the system, etc.)
   <!--[if !supportLists]-->• <!--[endif]-->Can you do route segmentation by call completion rate?
   <!--[if !supportLists]-->• <!--[endif]-->Do you know call patterns by time of the day? (# of calls probably. Call paths, not likely)

2. Do you know the problem areas of your speech application beyond simple throughput problems?
   <!--[if !supportLists]-->• <!--[endif]-->Are there any loops that the caller might encounter?
   <!--[if !supportLists]-->• <!--[endif]-->Is there a particular sequence of prompts leading to a higher rate of early call termination?
   <!--[if !supportLists]-->• <!--[endif]-->Do you know why and where in the system callers choose to speak to a live agent and what sequence of prompts leads to it?
   <!--[if !supportLists]-->• <!--[endif]-->Can you do segmentation of the various prompt sequences in the speech application by prompt duration, by prompt proximity to a certain class of events such as call termination, caller interaction with the system, etc.?

3. How do you measure the effectiveness of the your speech application and the impact of a change?
   <!--[if !supportLists]-->• <!--[endif]-->Can you devise patterns for calls with different levels of customer satisfaction and do call segmentation by those levels?
   <!--[if !supportLists]-->• <!--[endif]-->How do you measure the impact of the change in the system on customer satisfaction levels?

The XOLAP system may also be used the security and compliance analysis. In particular, trouble-shooting security breaches has always been one of the hardest analytical challenges. It is hard because the breach event takes place over a period of time and consists of multiple steps that form trees, hierarchies and graphs. Thus, doing path analysis for a security breach is largely the process of recreating those graphs out of huge volumes of data. The XOLAP system can accomplish this task without custom coding, by using its path analysis modeling capabilities as follows:

1. When you know that an intrusion took place and you need to protect your system:
   <!--[if !supportLists]-->• <!--[endif]-->How do you analyze the routes that the intruder followed?
   <!--[if !supportLists]-->• How do you identify all possible routes that an intruder could use?
   <!--[if !supportLists]-->• Can you do route segmentation by risk?
   <!--[if !supportLists]-->• <!--[endif]-->Do you know intrusion patterns by IP, region, technology used?

2. Do you know where the potential intruder goes after bouncing off your intrusion detection system?
   <!--[if !supportLists]-->• <!--[endif]-->Are you aware of any repeated offenders?
   <!--[if !supportLists]-->• <!--[endif]-->Do you know the patterns leading to intrusion detection?
   <!--[if !supportLists]-->• <!--[endif]-->Do you know what percentage of attacks are being prevented?

<!--[if !supportLists]-->• <!--[endif]-->Are you sure that your IDS does the job?<!--[if !supportLists]-->•

Compliance analytics for most part is very similar to security analytics. Compliance is typically governing sequences of events taking place over a period time. A typical compliance violation is an event that takes place out of the sequence. In financial services, equity transaction latency is a common culprit. The XOLAP system path analysis is an easy way to classify transactions in the context of the entire deal that might start with a phone call or IM message, then go through an e-mail and end-up with an execution that is 12 hours late in order to get additional (and illegal) gains through price differences.

Elements in Hierarchies Example

Figure 20:
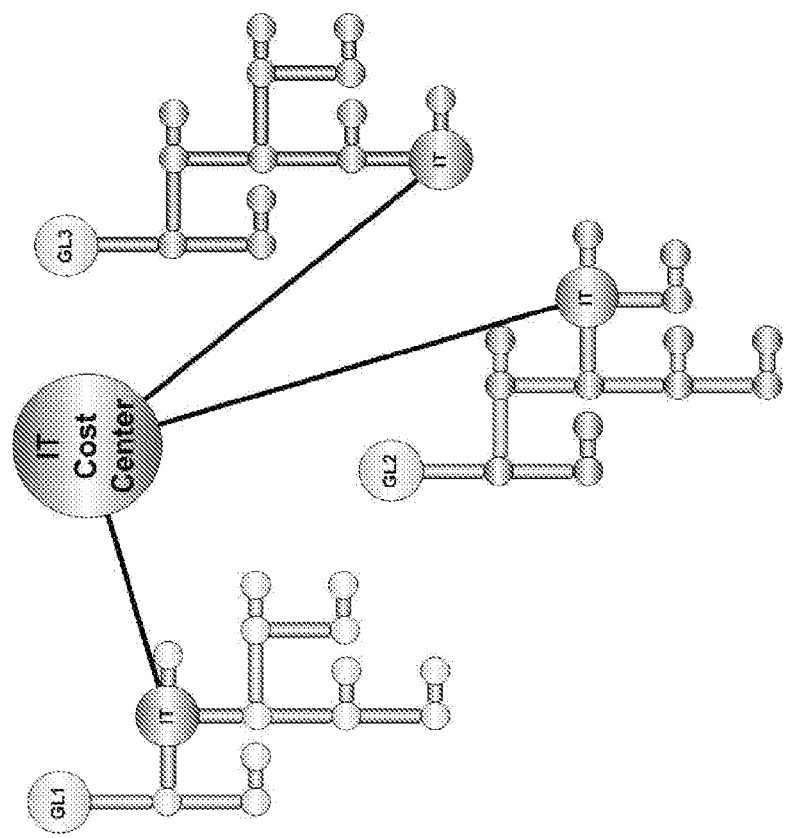
FIG. 20 illustrates an example of a multiple hierarchy problem that can be solved using the XOLAP system.

The XOLAP system also permits a user to discover similar elements in different hierarchies. For example, as shown in FIG. 20, an organization may have different divisions in which each division maintains its expense information (a general ledger) in a different hierarchical model. As shown in FIG. 20, all of the divisional have an "IT" expense item, but that expense item is at different locations in the hierarchy for each division. In a typical BI system, it is difficult to aggregate those IT expenses to produce a quarterly, monthly or yearly IT expense report across the entire organization without a lot of programming and a custom application.

Figure 21:
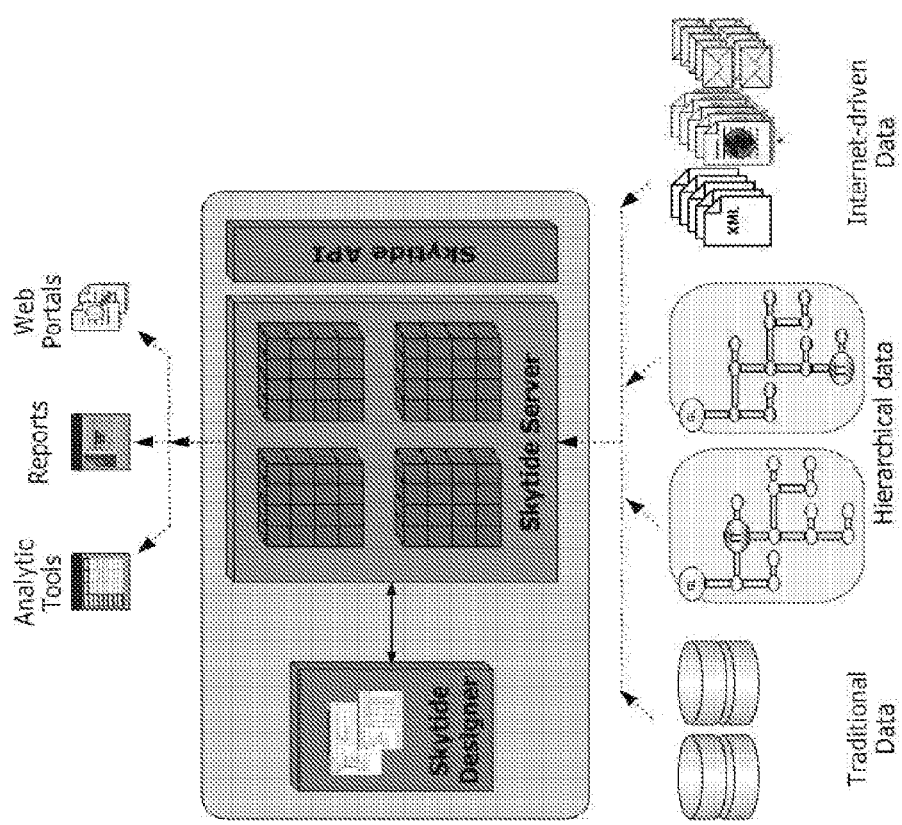
FIG. 21 illustrates the general ledger data sets in FIG. 20 being read into the XOLAP system.
Figure 22:
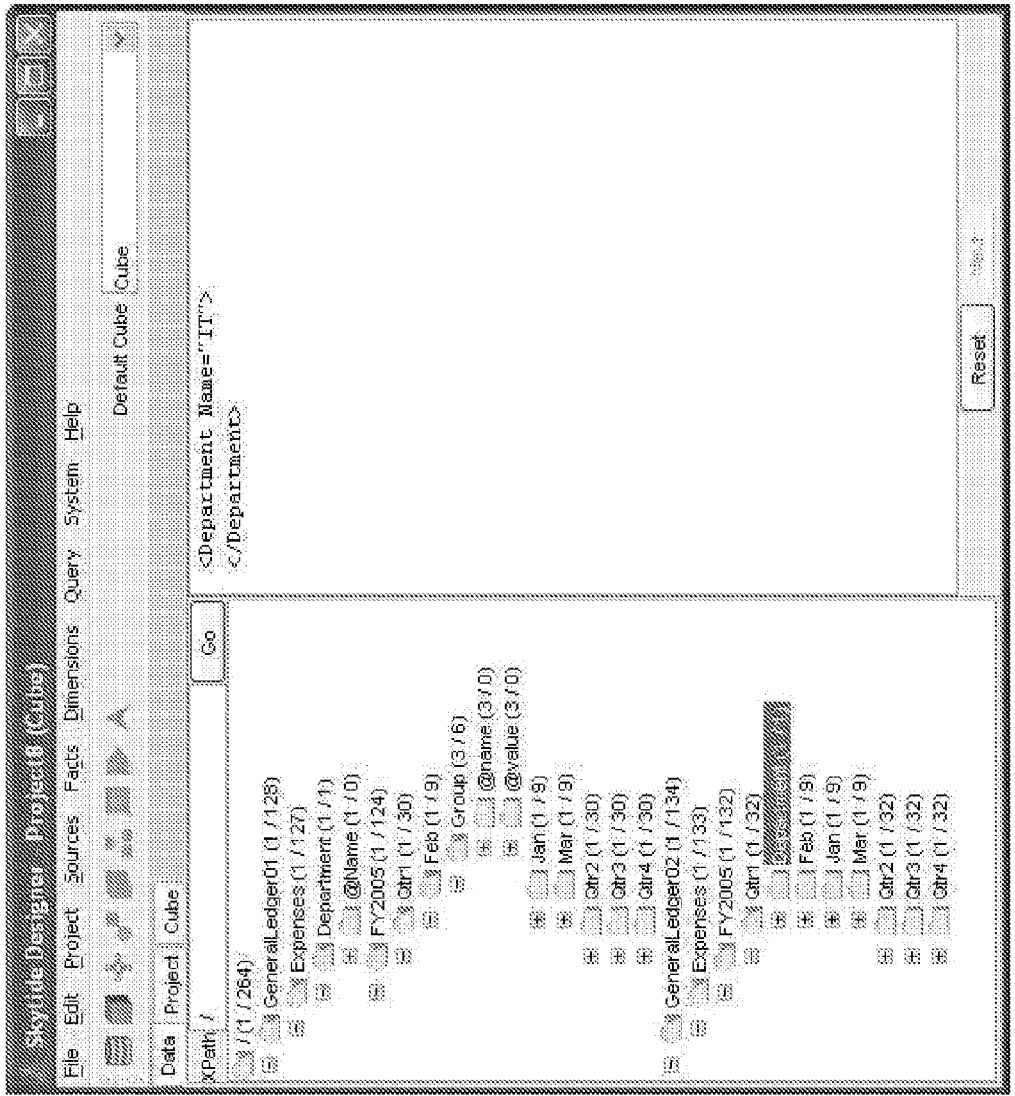
FIG. 22 illustrates an example of a virtual schema generated by the XOLAP system for the data shown in FIG. 20.
Figure 23:
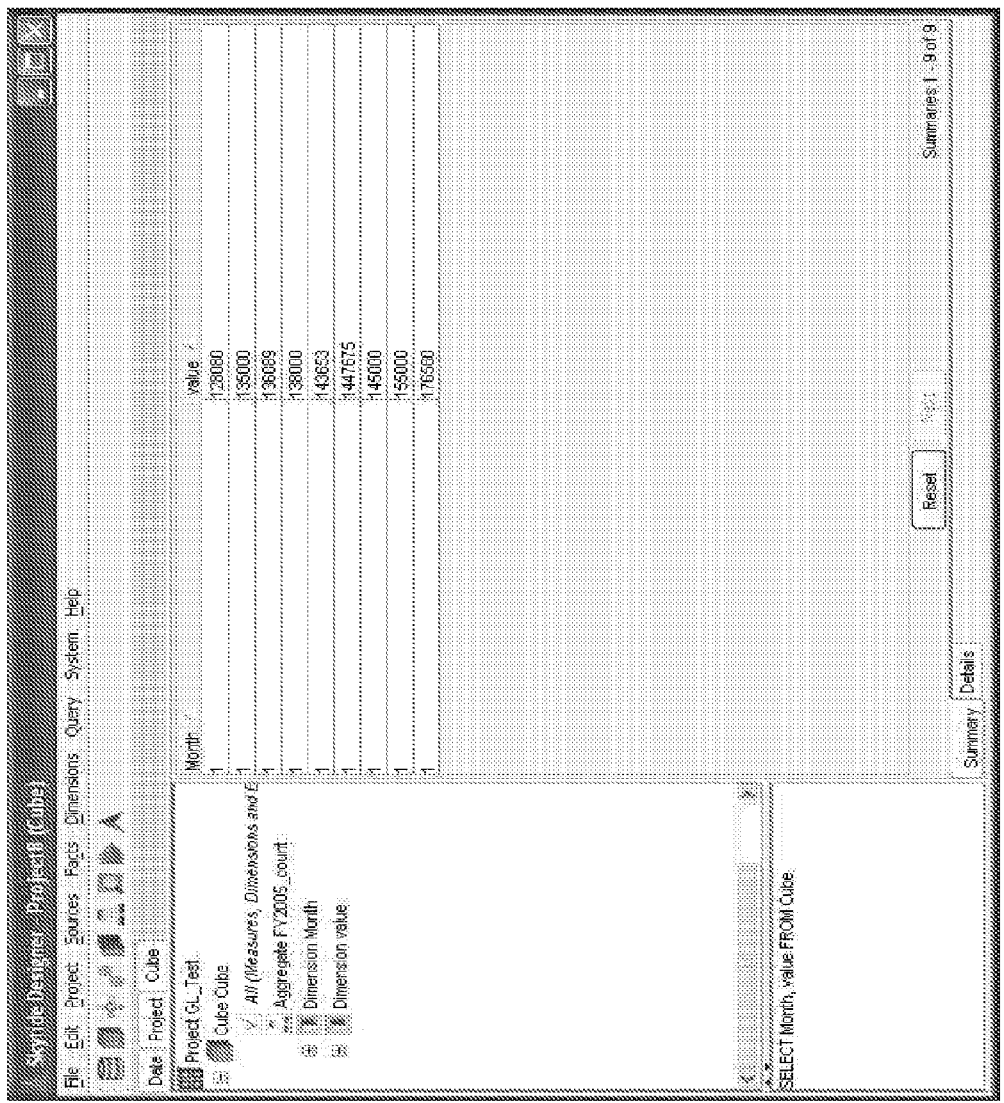
FIG. 23 illustrates an example of a dimensional analytical model generated by the XOLAP system for the data shown in FIG. 20.
Figure 24:
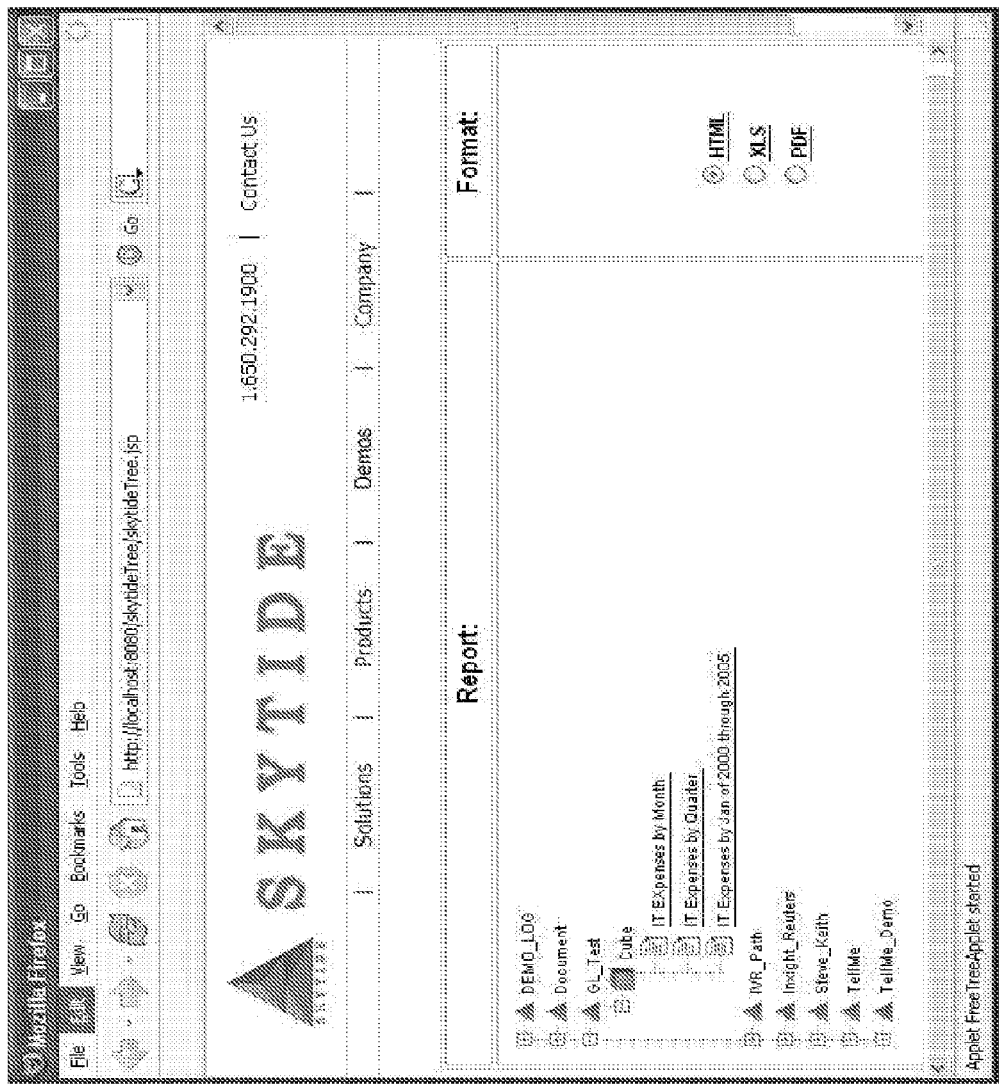
FIG. 24 illustrates an example of a set of reports generated using the dimensional analytical model of FIG. 23.

As shown in FIG. 21, the ledger data with the different hierarchies can be read into the XOLAP system. As shown in FIG. 22, a virtual schema for those ledger data sets can be created. FIG. 22 also shows that a dimension for "IT" may be created in the virtual schema that permits the XOLAP system to easily accumulate the IT expenses. First, as described above, the ledger data is converted into a common format and then an analytical model for all of the IT cost centers may be handled with a single analytical model as shown in FIG. 22. FIG. 23 illustrates an example of the results of the application of the analytical model to the ledger data wherein the IT expense data for each month has been aggregated from the ledger data sets. In order to aggregate the IT expense information, the path "/*/IT" and "/*/*IT" are used to gather the IT related expenses for two of the ledger data sets shown in FIG. 20. FIG. 24 illustrates an example of the different reports that can be generated by the XOLAP system.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An extended online analytical apparatus for one or more data sources wherein each data source has a data format, comprising:
   an aggregator that aggregates one or more pieces of data from the one or more data sources to generate aggregated pieces of data;
   a virtual schema generator that generates an XML-based virtual schema from the aggregated pieces of data without a data warehouse and without a data warehouse data model, wherein the virtual schema is a multidimensional data model generated based on the data format of the one or more data sources; and
   an analytical cube generator that generates an eXtensible on-line analytical processing (XOLAP) cube by executing commands from a declarative language against the virtual schema.

2. The apparatus of claim 1 further comprising one or more report definitions, each report definition defining a report to be generated based on the pieces of data in the analytical cube.

3. The apparatus of claim 1 further comprising a cache that stores the virtual schema.

4. The apparatus of claim 1 further comprising one or more adaptors associated with one or more data sources, each adaptor converting one or more pieces of data from a particular data source having a particular data format into a common data format.

5. The apparatus of claim 1 further comprising an indexing engine and a scheduler that update the virtual schema when new pieces of data are received by the aggregator.

6. The apparatus of claim 1 further comprising an application programming interface to an external tool wherein the application programming interface permits the external tool to access the piece of data in the analytical cube.

7. The apparatus of claim 1, wherein the one or more data sources further comprise at least one of a relational data source and a non-relational data source.

8. The apparatus of claim 1, wherein the analytical cube generator generates a fact, a product dimension, a time dimension and a sales dimension.

9. A computer-implemented method for generating dimensional analytical models from extensible data, the method comprising:
   receiving, at a computer, one or more pieces of data from one or more data sources wherein the data sources include at least one of a relational data source and a non-relational data source;
   forming, using an analytical cube generator associated with the computer, a multidimensional analytical model for the one or more pieces of data from one or more data sources; and
   wherein forming the multidimensional analytical model further comprises using a declarative language to describe the multidimensional analytical model by executing commands from the declarative language against a virtual schema that is generated without a data warehouse and without a data warehouse data model.

10. The method of claim 9, wherein using the declarative language further comprises using xPath to describe the multidimensional analytical model by executing commands from the declarative language against a virtual schema that is generated without a data warehouse and without a data warehouse data model.

11. The method of claim 9 further comprising performing path analysis using the multidimensional analytical model wherein the path analysis is based on the declarative language.

12. The method of claim 11, wherein performing path analysis further comprises uncovering data about a sequence of events contained in the one or more pieces of data from one or more data sources.

13. The method of claim 9 further comprising identifying, using the multidimensional analytical model, co-occurrences between the one or more pieces of data from one or more data sources.

14. The method of claim 9 further comprising determining an aggregated value for a particular piece of data from the one or more pieces of data wherein a first set of pieces of data has a first hierarchical structure that contains the particular piece of data and a second set of pieces of data has a second hierarchical structure that contains the particular piece of data at a different location than the first hierarchical structure, and wherein determining the aggregated value further comprises extracting the particular piece of data from each hierarchical structure using the multidimensional analytical model.

15. The method of claim 9, wherein receiving one or more pieces of data further comprises receiving, at a server computer, one or more pieces of data from one or more data sources wherein the data sources include at least one of a relational data source and a nonrelational data source, and wherein forming the multidimensional analytical model further comprises forming, using an analytical cube generator associated with the server computer, a multidimensional analytical model for the one or more pieces of data from one or more data sources.

16. The method of claim 9 further comprising converting, using one or more adapters that are associated with the computer, the one or more pieces of data from the one or more data sources into a common data format.

17. The method of claim 9, wherein forming the multidimensional analytical model further comprises generating a fact, generating a product dimension, generating a time dimension and generating a sales dimension.

* * * * *